United States Patent
Scally et al.

(10) Patent No.: US 10,289,680 B2
(45) Date of Patent: May 14, 2019

(54) REAL TIME PARSING AND SUGGESTIONS FROM PRE-GENERATED CORPUS WITH HYPERNYMS

(71) Applicant: Oath Inc., New York, NY (US)

(72) Inventors: Jonathan R. Scally, Arlington, VA (US); Richard Caneba, Sunnyvale, CA (US); Nick Cassimatis, Sunnyvale, CA (US)

(73) Assignee: Oath Inc., New York, NY (US)

( * ) Notice: Subject to any disclaimer, the term of this patent is extended or adjusted under 35 U.S.C. 154(b) by 0 days.

(21) Appl. No.: 15/169,101

(22) Filed: May 31, 2016

(65) Prior Publication Data

US 2017/0344534 A1    Nov. 30, 2017

(51) Int. Cl.
*G06F 17/27* (2006.01)
*G06F 17/30* (2006.01)

(52) U.S. Cl.
CPC ........ *G06F 17/2785* (2013.01); *G06F 17/271* (2013.01); *G06F 17/277* (2013.01); *G06F 17/2795* (2013.01); *G06F 17/30684* (2013.01); *G06F 17/30737* (2013.01); *G06F 17/30867* (2013.01); *G06F 17/30976* (2013.01)

(58) Field of Classification Search
CPC .................................. G06F 17/27; G06F 17/30
See application file for complete search history.

(56) References Cited

U.S. PATENT DOCUMENTS

| | | | |
|---|---|---|---|
| 6,076,051 A | * | 6/2000 | Messerly .......... G06F 17/30684 704/10 |
| 6,839,669 B1 | | 1/2005 | Gould et al. |
| 6,950,793 B2 | | 9/2005 | Ross et al. |
| 7,127,402 B2 | | 10/2006 | Ross et al. |
| 7,249,018 B2 | | 7/2007 | Ross et al. |
| 7,302,383 B2 | | 11/2007 | Valles |
| 7,587,308 B2 | | 9/2009 | Kasravi et al. |
| 8,180,629 B2 | | 5/2012 | Rehberg |
| 8,818,795 B1 | | 8/2014 | Cassimatis et al. |
| 2009/0012842 A1 | | 1/2009 | Srinivasan et al. |
| 2009/0119095 A1 | | 5/2009 | Beggelman et al. |
| 2010/0057463 A1 | | 3/2010 | Weng et al. |
| 2012/0016678 A1 | | 1/2012 | Gruber et al. |
| 2014/0324429 A1 | * | 10/2014 | Weilhammer ........ G10L 15/063 704/244 |
| 2016/0224217 A1 | * | 8/2016 | Kim ..................... G06F 3/0482 |

* cited by examiner

*Primary Examiner* — Qian Yang
(74) *Attorney, Agent, or Firm* — Cooper Legal Group, LLC

(57) ABSTRACT

Systems and methods of natural language processing in an environment with no existing corpus are disclosed. The method includes defining an input grammar specific to a chosen domain, the input grammar having a domain specific knowledge and general grammatical knowledge. Groups of tokens are identified within the input grammar having syntactic and semantic equivalence. The identified groups are assembled into hypernyms, wherein the hypernyms include a semantic output for each token in the hypernyms. A list of fields is then combined with the hypernyms for combination with the hypernyms. A corpus of possible combinations of hypernyms and fields is created. A data structure mapping each possible combination to a partial semantic output is generated and the data structure is saved for use in later processing.

19 Claims, 4 Drawing Sheets

REAL TIME PARSING AND SUGGESTIONS FROM PRE-GENERATED CORPUS WITH HYPERNYMS

BACKGROUND

1. Technical Field Text

The disclosed embodiments are related to search technology and more particularly to natural language processing.

2. Background Information

Traditionally, computer programs have used a structured language for input. For example, a conventional search engine may parse Boolean-style syntax, such as may be used in a search query. For example, the search query "college OR university" may return results with "college," results with "university," or results with both, while the search query "college XOR university" may return results with "college" or results with "university," but not results with both.

More recently, there has been an effort to develop systems for natural language processing (NLP) to allow input using a natural language. As natural language systems become ubiquitous, users of such systems expect a progressively higher quality in their conversational interfaces. Because users utilize these systems for real time information retrieval, there is also a significant performance requirement, particularly for systems deployed at web scale.

Most current NLP solutions are therefore implemented with machine learning techniques, which are run over large corpora of training data sets, both for general queries, as well as domain specific queries. (If domain specific corpora are used, categorizers can be trained to first detect the domain of the query, and then interpret the query based on the domain.) This creates two specific problems. First, adding natural language solutions to a particular domain requires a large data science team, with access to large sets of historical queries. This makes NLP interfaces very exclusive, provided by providers with such data teams, and provided only for domains with large corpora.

This situation described above has two distinct "long tails". There is a long tail for groups with private data or small data sets that cannot afford the efforts of a full data science team. Any group without an existing corpora, either because the data and queries are private, or because utilization is too low, will therefore be excluded from this potentially rich interface. There is a similar long tail for queries and constructions with frequencies so low that they are not captured by such techniques. With domains that are progressively more complex (and thus require more precise understanding) such as queries over a relational database system, the percentage of queries that fall into this long tail goes up precipitously.

To give an example in a domain such as email search, consider the variations of semantically identical ways to say "email from john"

"email from john"
"email john received"
"john's email"
"email received by john"
"email that john got"
"email that was received by john"

As these phrases become more complex, they become more awkward, but are still obviously semantically identical to the most common base: "email from john". However, techniques that attempt to identify a person name along with an email object (and ignore the prepositions, verbs, and other supporting words) will be confounded by cases where a recipient and a sender are both specified, particularly in situations where the instances do not directly appear in a corpora.

One possible solution is defaulting to a "From" interpretation, which might seem a good tradeoff in a situation where a person name in an email query specifies "From" semantics 95% of the time. However, in the cases where a "To" semantics is explicitly specified, such a system would be wrong 100% of the time, and such technology would not be extendible to other domains with less skewed semantics. As the bar for conversational interfaces rises, this becomes a less acceptable tradeoff.

Thus it would be beneficial to gain comprehensive and exhaustive grammatical (and even not-quite-grammatical) coverage over domains with sparse or non-existent corpora. Solving this problem would enable the capability of NLP systems to domains where corpora are non-existent, to sparse, or are too difficult to obtain or process.

BRIEF SUMMARY

In one aspect, the disclosure is directed to a method of generating an indexed corpus for lookup in a natural language processing system. The method includes defining an input grammar specific to a chosen domain, with the input grammar including a domain specific knowledge and general grammatical knowledge. Semantic groupings of tokens are identified within the input grammar having syntactic equivalence. The identified groups are assembled into hypernyms, with the hypernyms including a full semantic output for each token in the hypernyms. A list of fields is provided for combination with the hypernyms. A corpus of valid combinations of hypernyms and fields is generated from the list of fields and the hypernyms, along with a data structure mapping each valid combination to a partial semantic output.

In some embodiments, the corpus of valid combinations includes all possible combinations less than a given length. In some embodiments, the input grammar comprises a lexicon, grammatical structures, and a semantic output for each lexical item in the lexicon. In some embodiments, the list of fields comprises text fields for input of names and keywords and custom tokes for input of dates and locations.

In some embodiments, the method further includes generating a second data structure mapping partial tokens to each valid combination whose first several tokens match the partial tokens. In some embodiments, the method further includes filtering the corpus to remove pragmatically irrelevant items.

In another aspect a method of generating a semantic output from a natural language input is disclosed. The method includes loading a data structure into computer memory, the data structure including sequences of tokens comprised of hypernyms, text fields, and custom tokens. The hypernyms include syntactically and semantically equivalent entries. Data mapping the semantics information for each token in the corpus is further loaded into memory. A natural language query is received and converted into a set of possible tokenizations, the possible tokenizations comprising combinations of text fields, custom tokens, and hypernyms. The possible tokenizations are looked up against the hypernym corpus in the data structure to determine semantics for the possible tokenizations. The determined semantics are then returned.

In some embodiments, the method further includes appending the semantics for each lexical item in the input query prior to outputting the determined semantics.

In some embodiments, the data structure further includes a second data structure that maps partial tokens to complete tokens and the method further includes looking up each partial token in the second data to determine complete tokens starting with the partial token and returning a list of suggestions based on the complete tokens starting with the partial token.

In some embodiments, the natural language query is received over a network.

In some embodiments, at least one field is selected from the group consisting of names, keyword, dates, and locations.

In another aspect, a system for generating an indexed corpus for lookup in a natural language processing system is disclosed. The system includes a processor; and memory storing computer executable instructions that cause the processor to implement software components. The software components include a generator component configured to receive a pre-defined grammar and combine syntactically and semantically equivalent elements in the lexicon of the grammar into hypernyms to generate a hypernym corpus, a mapping component configured to map the hypernym corpus to a semantic meaning associated with the hypernym; and a lookup component configured to receive a query, convert the query into a combination of hypernyms, and lookup the combination of hypernyms against the hypernym corpus map to determine a semantic meaning of the query.

In some embodiments, the software components further include a suggestion component configured to map partial tokens in the hypernym corpus to complete tokens in the hypernym corpus and to generate suggestions for the query based on how the completed tokens correspond to a partial token matching the query.

In some embodiments, the corpus of hypernym corpus includes all combinations less than a given length.

In some embodiments, the generator component is further configured to filter the hypernym corpus to remove pragmatically irrelevant items.

In some embodiments, the input grammar includes a lexicon, grammatical structures, and a semantic output for each lexical item in the lexicon.

In some embodiments, the generator combines the syntactically and semantically equivalent elements in the lexicon with a list of fields selected from the group consisting of text fields and custom tokens.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The claimed subject matter is related to natural language processing.

Illustrative Environment

Figure 1:
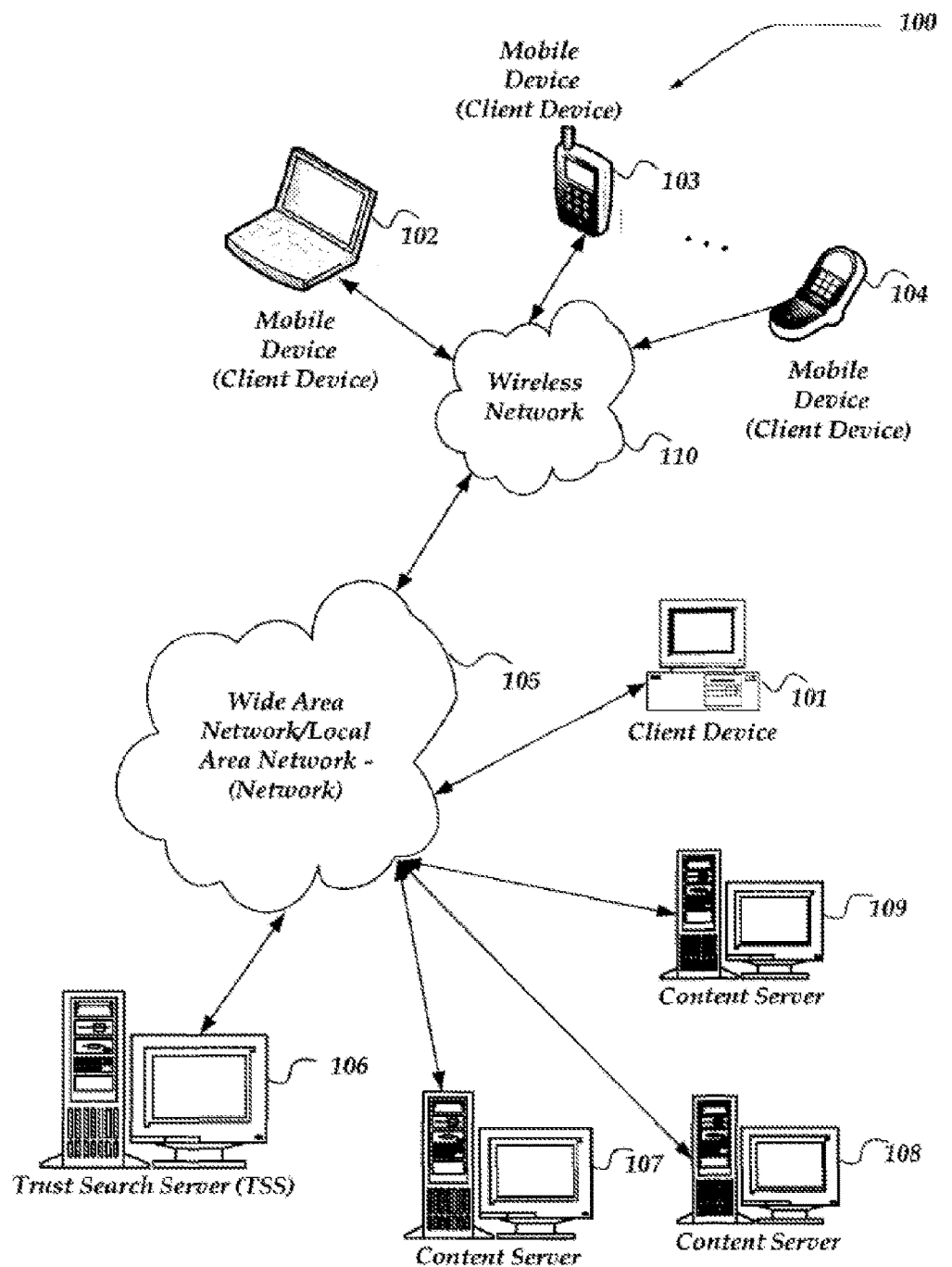
FIG. 1 illustrates a network

FIG. 1 is a schematic diagram illustrating an example embodiment of a network 100. Other embodiments that may vary, for example, in terms of arrangement or in terms of type of components, are also intended to be included within claimed subject matter. As shown, FIG. 1, for example, includes a variety of networks, such as local area network (LAN)/wide area network (WAN) 105 and wireless network 110, a variety of devices, such as client device 101, mobile devices 102, 103, and 104, and a variety of servers such as content servers 107, 108, and 109, and search server 106.

The network 100 may couple devices so that communications may be exchanged, such as between a client device, a search engine, and an ad server, or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Computing Device

Figure 2:
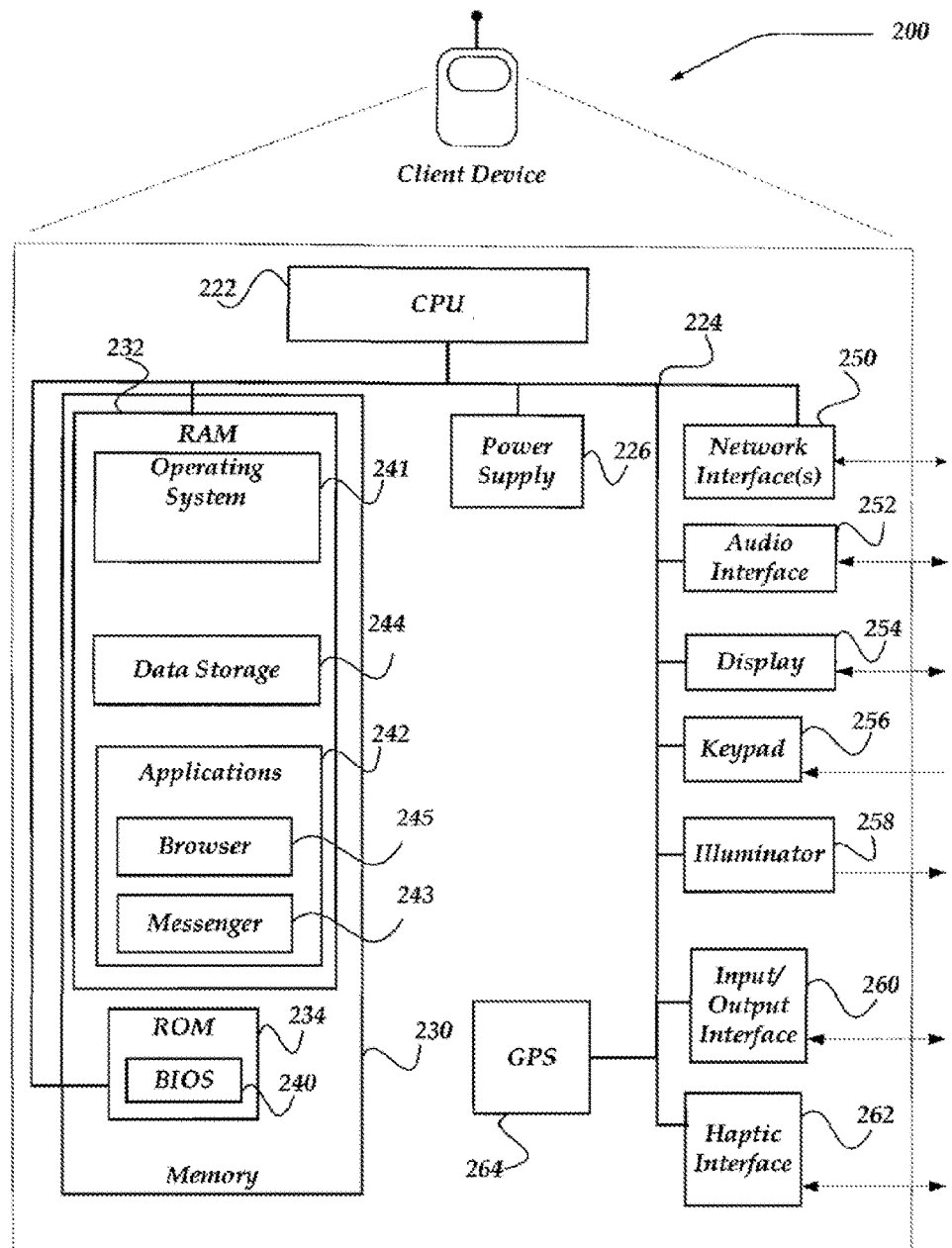
FIG. 2 illustrates a computing device.

FIG. 2 illustrates an example schematic of an embodiment of a computing device 200. The computing device 200 includes a memory 230 that stores computer readable data. The memory 230 may include random access memory (RAM) 232 and read only memory (ROM) 234. The ROM 234 may include memory storing a basic input output system (BIOS) 230 for interfacing with the hardware of the client device 200. The RAM 232 may include an operating system 241, data storage 244, and applications 242 including a browser 245 and a messenger 243. A central processing unit (CPU) 222 executes computer instructions to implement functions. A power supply 226 supplies power to the memory 230, the CPU 222, and other components. The CPU 222, the memory 230, and other devices may be interconnected by a bus 224 operable to communicate between the different components. The computing device 200 may further include components interconnected to the bus 224 such as a network interface 250 that provides an interface between the computing device 200 and a network, an audio interface 252 that provides auditory input and output with the computing device 200, a display 254 for displaying information, a keypad 256 for inputting information, an illuminator 258 for displaying visual indications, an input/output interface 260 for interfacing with other input/output devices, haptic feedback interface 262 for providing tactile feedback, and a global positioning system 264 for determining a geographical location.

Client Device

A client device is a computing device 200 used by a client and may be capable of sending or receiving signals via the wired or the wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features and need not contain all of the components described above in relation to a computing device. Similarly, a client device may have other components that were not previously described. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

Servers

A server is a computing device 200 that provides services, such as search services, indexing services, file services, email services, communications services, and content services. Servers vary in application and capabilities and need not contain all of the components of the exemplary computing device 200. Additionally, a server may contain additional components not shown in the exemplary computing device 200. In some embodiments a computing device 200 may operate as both a client device and a server.

Terminology

In the following discussion, reference will be made to the term domain. Domain is defined as environment in which the natural language processing will take place. It may be application specific, specific to an organization, or a technical field. For example, the domain of an email application would include information related to sending and receiving email, addressing individuals and groups, scheduling, and so forth. In another example, a domain related to navigation might include information related to directions, addresses, geography, and distance. Other types of domains are possible and these examples are not meant to be inclusive.

In the following discussion, reference will be made to the term grammar. Grammar is the rules by which a language is defined. The grammar contains a lexicon, grammatical structures, and semantic output for each lexical item, as well as each potential grammatical relation. A lexicon is information about words of a language and what categories they belong to. The lexicon may contain further information, such as the type of verb or noun. Grammatical structures describe the rules of the language that relate the form of phrases and sentences. The semantic output describes a meaning for each lexical item. The grammar may vary by domain. For instance, in the domain of email, forward is a verb, i.e. to forward an email, whereas in navigation, forward is a noun, i.e. move forward.

In the following discussion, reference will be made to the term token. A token is a data structure representing a string of characters forming a syntactic unit and a category associated with the token. For example, the word "mail" may be a syntactic unit assigned a category of noun. A syntactic unit need not be a complete word and may have multiple categories assigned to it.

In the following discussion, reference will be made to the term "hypernym." A hypernym is a semantic unit whose meaning includes the meaning of other semantic units. For example, "mammal" is a hypernym of dog, cat, and horse, and dog is a hypernym of spaniel, poodle, and beagle. Mammal would also be a hypernym of spaniel, poodle, and beagle, since they are contained within the general meaning of a mammal.

Overview

Embodiments include a system and a method for natural language processing. The system may be implemented as software modules executing on a computing device as shown in FIG. 2. In some embodiments, different modules may execute on separate computing devices, or in other embodiments they may be executed on the same computing device. The system generally comprises a pre-query component for creating a data structure for looking up queries and a real-time component for receiving a query and performing the lookup.

Pre-Query

Figure 3:
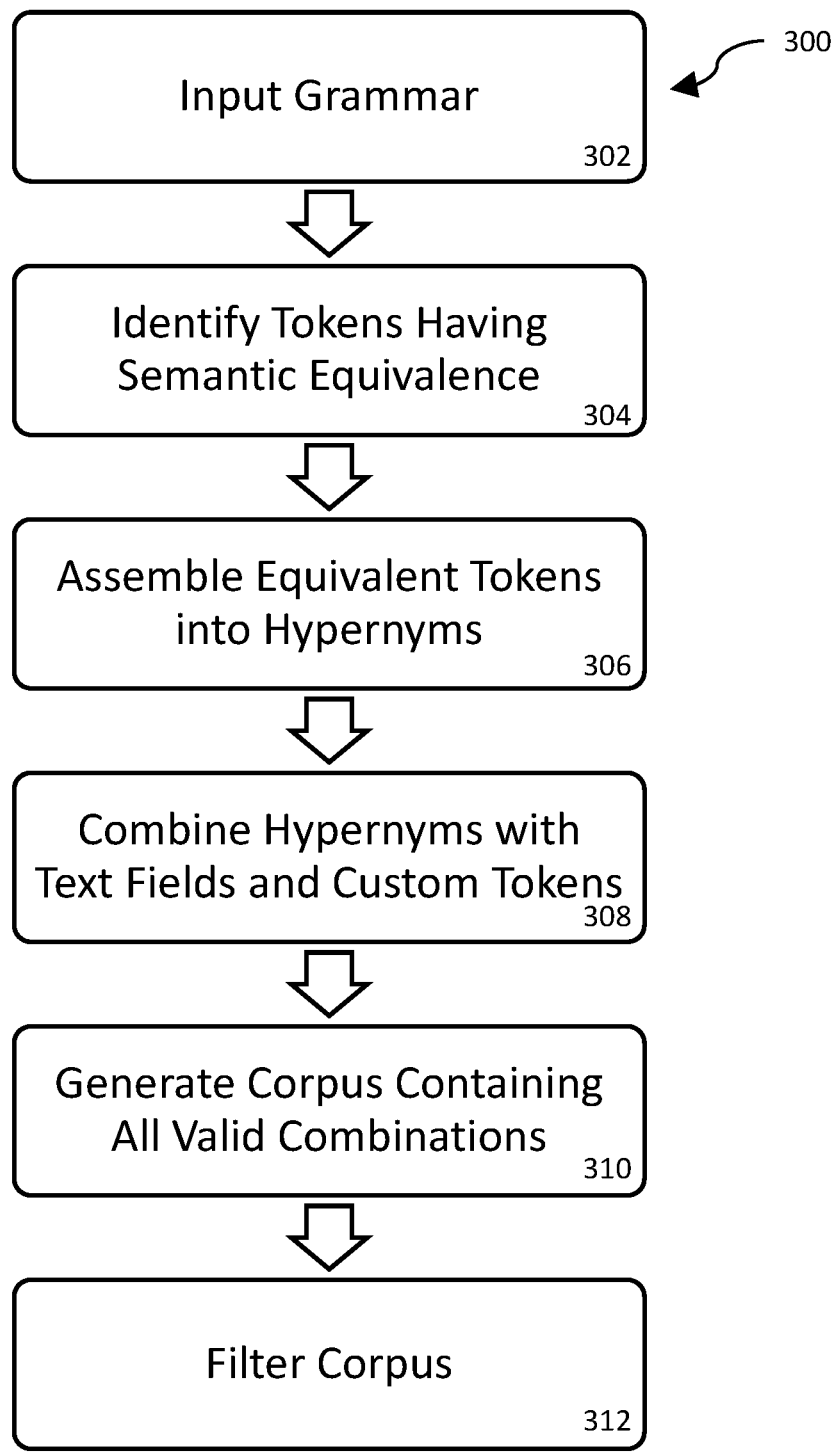
FIG. 3 illustrates a method for generating a corpus mapped to a partial semantic output.

FIG. 3 illustrates a flow chart 300 of a method for creating a corpus for use in a natural language processing system for a given domain. This method creates a corpus based on a predefined input grammar. One example of creating a predefined input grammar is found in U.S. Pat. No. 8,818,795, which is hereby incorporated by reference.

The method begins at block 302 in which the input grammar is input into a "generator." The generator is a process that identifies tokens having a semantic equivalence in the domain of the input grammar. The process is performed by a computing device 200 having computer executable instructions for performing the described functions. The following is an example of snippet of an input grammar for the category of "Food".

```
{
    "meaning": {"referent": {"IsA": "Food"}},
    "pattern": [
        "food",
        "lunch",
        "dinner",
        "snack"
    ],
    "id": "Food",
    "type": "CommonNounMass" ( )
},
```

The first line contains the semantic meaning for the category. Each token matching the pattern in the following lines is considered a synonym with the semantic meaning of a food. The "id" field provides a common id for the category, and the type field identifies the type of token in the category. In this example, if any of the text patterns "food", "lunch", "dinner", or "snack" are identified, the semantic meaning of the token is given as "Food". In actual use, the input grammar would be considerably larger, and would contain a large number of categories and synonyms for each category.

In block 304, the generator identifies the tokens having a semantic and syntactic equivalence. For example, in the preceding example of an input grammar, the tokens "food", "lunch", "dinner", and "snack" would each be identified as having syntactic equivalence, grouped under a particular semantic interpretation.

In block 306, the generator assembles the equivalent tokens identified in block 304 into hypernyms. In one example, a hypernym is of the form %RECEIVE_PAST_PASSIVE%. This hypernym includes tokens having the semantic meaning of "receive" including types that are past tense and passive. For example, tokens such as "received" and "gotten" would fall into this hypernym. The individual tokens within the hypernyms maintain their distinct semantic information within the hypernym. The output of block 306 is a list of hypernyms containing a map which maintains the distinct semantic information for each token within the hypernym.

In block 308, the generator combines the hypernyms from block 306 with a list of "text fields" (e.g. person names or keywords) and "custom tokens" (e.g. dates or locations) to generate all possible combinations, consistent with the grammatical rules bind each of these token types together. To keep the size of the resulting corpus manageable, the number of possible combinations may have a limited length. The resulting corpus contains valid combinations of the tokens along with the text fields and custom tokens. For example, at this stage since the future user input is unknown, the text field is empty and serves as a placeholder until an actual name is received. Similarly, a custom token may be empty and serve as a placeholder until the actual value was received.

The following is an expansion of the hypernym of %SEARCHABLE_PLURAL% with a list of terms.
[%SEARCHABLE_PLURAL%
emails=>{"IsA":["Searchable","Email"]}
e-mails=>{"IsA":["Searchable","Email"]}
electronic mails=>{"IsA":["Searchable","Email"]}
mails=>{"IsA":["Searchable","Email"]}
messages=>{"IsA":["Searchable","Email"]}
correspondences=>{"IsA":["Searchable","Email"]}
letters=>{"IsA":["Searchable","Email"]}
attachments=>{"IsA":["Searchable","Attachment","Attachable"]}
files=>{"IsA":["Searchable","Attachment","Attachable"]}
documents=>{"IsA":["Searchable","Attachable","Document"]}
docs=>{"IsA":["Searchable","Attachable","Document"]}
pictures=>{"IsA":["Searchable","Attachable","Photo"]}
images=>{"IsA":["Searchable","Attachable","Photo"]}
photos=>{"IsA":["Searchable","Attachable","Photo"]}
photographs=>{"IsA":["Searchable","Attachable","Photo"]}
pics=>{"IsA":["Searchable","Attachable","Photo"]}
deliveries=>{"IsA":["Searchable","Deliver"]}
products=>{"IsA":["Searchable","Delivery"]}
packages=>{"IsA":["Searchable","Deliver"]}
links=>{"IsA":["Searchable","Link"]}
The result of each combination is a semantic meaning associated with the hypernym %SEARCHABLE_PLURAL% combined with a semantic meaning of a hypernym associated with the token. For example, the combination of %SEARCHABLE_PLURAL% and emails returns the semantic meaning "Searchable" and the semantic meaning "Email", which is the semantic meaning of the hypernym associated with emails. Because some tokens, such as pictures, belong to a hypernym having a semantic meaning of attachable and a hypernym having a semantic meaning of photo, both semantic meanings are included in the corpus.

While this example is relatively simple, in practice the corpus may be much more complex. For example, the following is an example of two actual corpus entries.
%RECEIVE_PP  %CLOUDLOCATABLE_PLURAL
  %SEND_PP
%GENERALCOMPLEMENTIZER are %PREP_CLOUDLOCATABLE_CL_FROM
%CLOUDLOCATIONS=>
{"receive_pp_1_ref":{"IsA":["Receive"]},
  "send_pp_3_ref":{"IsA":["Send"]},
  "cloudlocatable_plural_2_ref":{"IsA":["CloudLocatable","Searchable","Shareable","TextContaining", "Transferable"]},"cloudlocations_7_ref":{"IsA":["Cloud Locations"]},"generalcomplementizer_4_ref":{"IsA": ["Complementizer","GeneralComplementizer"]},"impliedReferent_1":{"Intent": "cloudlocatable_plural_2_ref"},"impliedReferent_3": {"ContentSource":"cloudlocations_7_ref"}, "prep_cloudlocatable_cl_from_6_ref":{"IsA": ["Prep_CloudLocatable_CL_From"]}}
%RECEIVE_PP %CLOUDLOCATABLE_PLURAL %SEND_PP
%GENERALCOMPLEMENTIZER were %PREP_CLOUDLOCATABLE_CL_FROM
%CLOUDLOCATIONS=>
{"receive_pp_1_ref":{"IsA":["Receive"]},
"send_pp_3_ref":{"IsA":["Send"]},
"cloudlocatable_plural_2_ref":{"IsA":["CloudLocatable","Searchable","Shareable","TextContaining","Transferable"]},"cloudlocations_7_ref":{"IsA": ["CloudLocations"]},"

In block 310, the corpus may optionally be filtered to compress the data. The filtering process uses domain knowledge to strip out pragmatically irrelevant items from the corpus. (e.g. in an email domain there can only be a single sender, so queries having multiple "from" phrases would be removed.) The output from the generator is a corpus of tokenized queries mapped to a partial semantic output.

Figure 4:
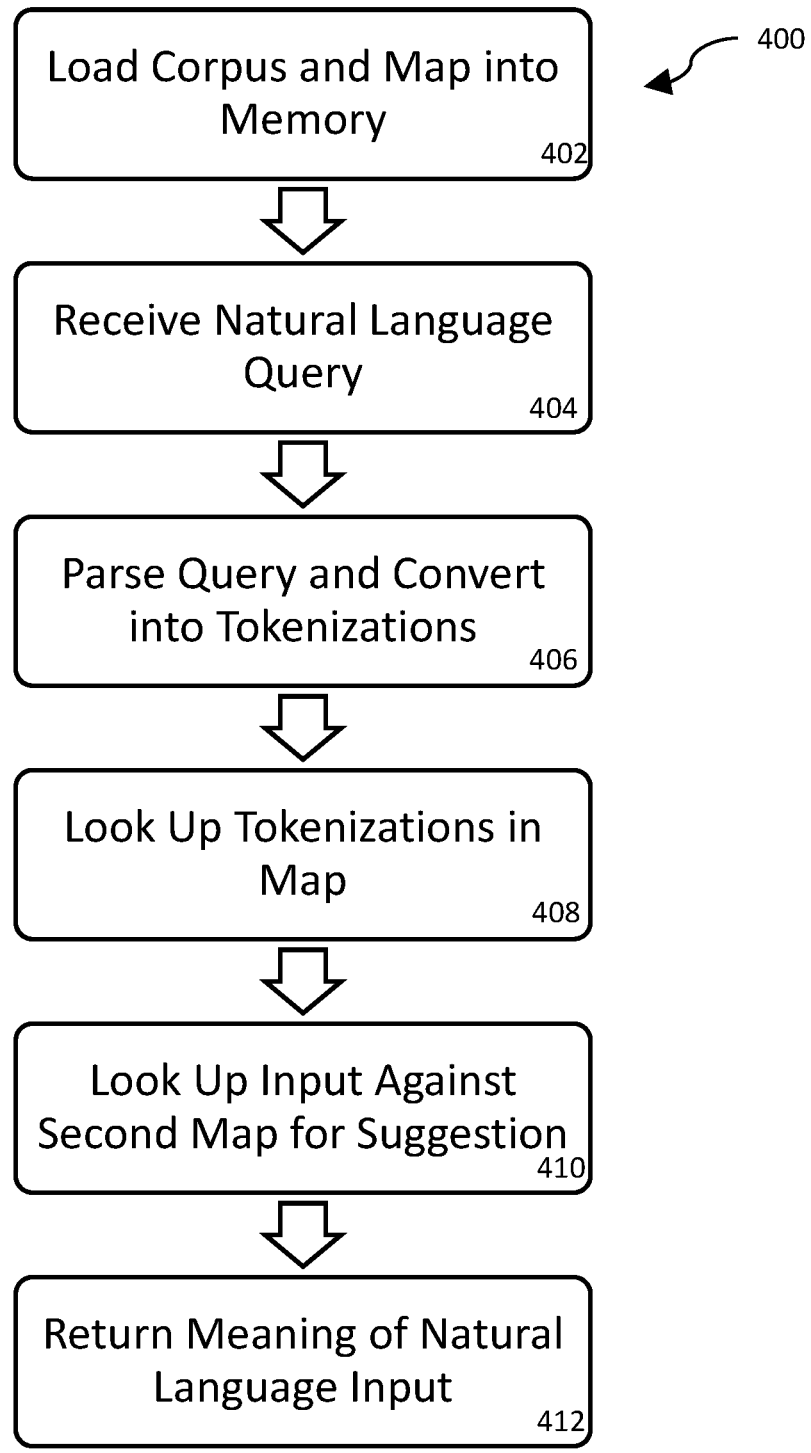
FIG. 4 illustrates a method of determining a semantic output for a natural language input.

FIG. 4 illustrates a flow chart of a method 400 for utilizing the output of the method of FIG. 3 in a natural language processing system. The method 400 begins at block 402 in which the output from the generator is received and loaded into memory of a computing device 200. This computing device may be a separate computing device from that which was used to generate the corpus. This computing device may be a computer local to a user performing a natural language input, or it may be remote from the user.

The corpus loaded into the memory of the computing device contains at least a map mapping tokenized corpus items to the relevant partial semantics. In some embodiments, a second map maps a partial tokenized item to all possible tokenized items that might be valid "starters". The use of the maps will be described in greater detail, but generally, the first map is used to lookup the semantic meaning of the natural language input, while the second map may be used for search suggestions.

In block 404, a user inputs a natural language query into the system and in block 406, the query system parses the query and converts it into a set of possible tokenizations, consisting of combinations of text fields, custom queries, and hypernyms. For example, the natural language phrase, "Show me email yesterday from John." may be parsed as:
Show me—domain general request prefix(ignored)
Email—hypernym %EMAIL_SINGULAR% or %TRANSEFRABLE or %SEARCHABLE
Yesterday—custom token—%DATE
From—hypernym, e.g. %PREPOSITION_FROM_PERSON%
John—Text field e.g. %TEXTFIELD or %PERSON In block 408, the system looks up the set of possible tokenizations within the first map. If a token from among the set of possible tokenizations is matched in the databases, the semantics of that match is retrieved. In block 410, the semantic meaning of the entry in the corpus matching the parsed and tokenized input is returned for further processing.

The retrieved semantics is further enhanced by appending the semantics for each lexical item in the input query. For example, the tokenization matching the query "email from nick" might be %TRANSFERABLE_PLURAL %PREP_TRANSFERABLE_PERSON_FROM %PERSON. The semantics from this pattern will be enhanced with the information that the token matching "Transferable" is an "Email, and that the text that matched % TRANSFERABLE_PLURAL was "emails".

Below is an example full output from the system after enhancement.
{"person_3_ref":{"_text":"nick","IsA":["People","Person"],"GroundedText"],"_id":"1","_char_start":"12", "_char_end":"15"},
"prep_transferable_people_by_2_ref":{"_text":"from", "IsA":["Prep_Transferable_People_By","From"], "_char_start":"7","_char_end":"10"},
"impliedReferent_1":{"Intent":
"transferable_plural_1_ref","From":"person_3_ref"},
"transferable_plural_1_ref":{"_text":"emails","IsA": ["Searchable","TextContaining","Transferable","Email"] "_char_start":"0","_char_end":"5"}}

Optionally, at block 408, the system uses the second map to generate a suggestion for the input. Each tokenized entry is treated as a partial input, such that as the input is received, possible matches of the query are added to the set. From this input set, queries are made against the first map for all the tokenizations that might be valid extensions of the input tokenization. The tokenizations may be returned and grounded out as appropriate. In this way a suggestion may be generated even for a completely novel input query. The resulting suggested may be ranked as necessary. Such ranking techniques are well known and known to one of ordinary skill in the art.

The described method may be carried out by a computing device as described in relation to FIG. 2. Instructions may be stored in memory and executed by a processor to carry out each of the described steps. The system and methods described previously provide recognizable benefits in the field of natural language processing through allowing coverage of domains having sparse or non-existent corpora for training a machine.

While various embodiments have been described above, it should be understood that they have been presented by way of example only, and not limitation. It will be apparent to persons skilled in the relevant arts that various changes in form and details can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A method for determining semantics of domain queries comprising:
   receiving an input query string from a remote device via a network connection;
   pre-defining an input grammar data structure specific to a chosen domain, the input grammar data structure comprising tokens identified by semantic identifiers and syntactic identifiers;
   identifying semantic groups of tokens corresponding to the semantic identifiers within the input grammar data structure having syntactic equivalence as signified by the syntactic identifiers;
   assembling each one of the identified semantic groups into a hypernym to obtain a plurality of hypernyms, wherein the hypernym comprises a hypernym data structure including a hypernym identifier combining a corresponding semantic identifier and syntactic identifier of the each one of the identified semantic groups, and tokens of the each one of the identified semantic groups mapped to semantic outputs, wherein at least one of the semantic outputs corresponding to one of the tokens includes a semantic identifier linking to another hypernym;

providing a list of fields for combination with the plurality of hypernyms, wherein the list of fields comprises text fields for input of names and keywords and custom tokens for input of dates and locations;

generating a corpus of valid combinations of hypernyms and fields, based on at least some of the plurality of hypernyms and at least some of the list of fields, according to a set of grammatical rules;

generating a first mapping data structure mapping each valid combination to a partial semantic output by combining the semantic outputs of the hypernym data structure;

determining semantics of the input query string based on a tokenization of the input query string, the corpus, and the first mapping data structure; and transmitting, to the remote device, a communication associated with a meaning of the input query string based on the semantics.

2. The method of claim 1, wherein the corpus of valid combinations includes all valid combinations less than a given length.

3. The method of claim 1, further comprising generating a second mapping data structure mapping partial tokens to each valid combination whose first several tokens match the partial tokens.

4. The method of claim 3, wherein determining semantics of the input query string based on the tokenization of the input query string, the corpus, and the first mapping data structure comprises:

tokenizing the input query string based on the input grammar data structure to obtain the tokenization of the input query string;

identifying a combination of hypernyms and fields in the corpus that matches a portion of the tokenization; and determining the semantics of the input query string based on the combination and the first mapping data structure.

5. The method of claim 1, further comprising filtering the corpus to remove pragmatically irrelevant items.

6. The method of claim 1, wherein the input grammar data structure comprises a lexicon, grammatical structures, and a semantic output for each lexical item in the lexicon.

7. The method of claim 1, wherein determining semantics of the input query string based on the tokenization of the input query string, the corpus, and the first mapping data structure comprises:

tokenizing the input query string based on the input grammar data structure to obtain the tokenization of the input query string;

identifying a combination of hypernyms and fields in the corpus that matches the tokenization; and determining the semantics of the input query string based on the combination and the first mapping data structure.

8. A system, comprising:

a processor; and memory storing computer executable instructions that cause the processor to perform acts comprising:

receiving an input query string from a remote device via a network connection;

pre-defining an input grammar data structure specific to a chosen domain, the input grammar data structure comprising tokens identified by semantic identifiers and syntactic identifiers;

identifying semantic groups of tokens corresponding to the semantic identifiers within the input grammar data structure having syntactic equivalence as signified by the syntactic identifiers;

assembling each one of the identified semantic groups into a hypernym to obtain a plurality of hypernyms, wherein each hypernym comprises a hypernym data structure including a hypernym identifier combining a corresponding semantic identifier and syntactic identifier of at least one of the identified semantic groups, and tokens of at least one of the identified semantic groups mapped to semantic outputs, wherein at least one of the semantic outputs corresponding to at least one of the tokens includes a semantic identifier linking to another hypernym;

providing a list of fields for combination with the plurality of hypernyms, wherein the list of fields comprises text fields for input of names and keywords and custom tokens for input of dates and locations;

generating a corpus of valid combinations of hypernyms and fields, based on at least some of the plurality of hypernyms and at least some of the list of fields, according to a set of grammatical rules;

generating a first mapping data structure mapping each valid combination to a partial semantic output by combining the semantic outputs of the hypernym data structure;

determining semantics of the input query string based on a tokenization of the input query string, the corpus, and the first mapping data structure; and transmitting, to the remote device, a communication associated with a meaning of the input query string based on the semantics.

9. The system of claim 8, wherein the corpus of valid combinations includes all valid combinations less than a given length.

10. The system of claim 8, the acts further comprising generating a second mapping data structure mapping partial tokens to each valid combination whose first several tokens match the partial tokens.

11. The system of claim 8, the acts further comprising filtering the corpus to remove pragmatically irrelevant items.

12. The system of claim 8, wherein the input grammar data structure comprises a lexicon, grammatical structures, and a semantic output for each lexical item in the lexicon.

13. The system of claim 8, wherein determining semantics of the input query string based on the tokenization of the input query string, the corpus, and the first mapping data structure comprises:

tokenizing the input query string based on the input grammar data structure to obtain the tokenization of the input query string;

identifying a combination of hypernyms and fields in the corpus that matches the tokenization; and determining the semantics of the input query string based on the combination and the first mapping data structure.

14. A non-transitory computer readable medium storing computer executable instructions that when executed by a processor cause the processor to perform acts comprising:

receiving an input query string from a remote device via a network connection;

pre-defining an input grammar data structure specific to a chosen domain, the input grammar data structure comprising tokens identified by semantic identifiers and syntactic identifiers;

identifying semantic groups of tokens corresponding to the semantic identifiers within the input grammar data structure having syntactic equivalence as signified by the syntactic identifiers;

assembling each one of the identified semantic groups into a hypernym to obtain a plurality of hypernyms, wherein each hypernym comprises a hypernym data structure including a hypernym identifier combining a corresponding semantic identifier and syntactic identifier of at least one of the identified semantic groups, and tokens of at least one of the identified semantic groups mapped to semantic outputs, wherein at least one of the semantic outputs corresponding to at least one of the tokens includes a semantic identifier linking to another hypernym;

providing a list of fields for combination with the plurality of hypernyms, wherein the list of fields comprises text fields for input of names and keywords and custom tokens for input of dates and locations;

generating a corpus of valid combinations of hypernyms and fields, based on at least some of the plurality of hypernyms and at least some of the list of fields, according to a set of grammatical rules;

generating a first mapping data structure mapping each valid combination to a partial semantic output by combining the semantic outputs of the hypernym data structure;

determining semantics of the input query string based on a tokenization of the input query string, the corpus, and the first mapping data structure; and transmitting, to the remote device, a communication associated with a meaning of the input query string based on the semantics.

15. The computer readable medium of claim 14, wherein the corpus of valid combinations includes all valid combinations less than a given length.

16. The computer readable medium of claim 14, the acts further comprising generating a second mapping data structure mapping partial tokens to each valid combination whose first several tokens match the partial tokens.

17. The computer readable medium of claim 14, the acts further comprising filtering the corpus to remove pragmatically irrelevant items.

18. The computer readable medium of claim 14, wherein the input grammar data structure comprises a lexicon, grammatical structures, and a semantic output for each lexical item in the lexicon.

19. The computer readable medium of claim 14, wherein determining semantics of the input query string based on the tokenization of the input query string, the corpus, and the first mapping data structure comprises:

tokenizing the input query string based on the input grammar data structure to obtain the tokenization of the input query string;

identifying a combination of hypernyms and fields in the corpus that matches the tokenization; and determining the semantics of the input query string based on the combination and the first mapping data structure.

* * * * *